United States Patent [19]

Milbreath et al.

[11] 4,175,388
[45] Nov. 27, 1979

[54] RADIATOR COOLING SYSTEM

[75] Inventors: Herman C. Milbreath, Washington; Alverson B. Williams, Sterling Heights, both of Mich.

[73] Assignee: General Motors Corporation, Detroit, Mich.

[21] Appl. No.: 887,489

[22] Filed: Mar. 17, 1978

[51] Int. Cl.² ............................................. F16D 33/00
[52] U.S. Cl. ........................................ 60/337; 60/397; 60/DIG. 5
[58] Field of Search ........... 60/337, 397, 411, DIG. 5, 60/329, 362

[56] References Cited

U.S. PATENT DOCUMENTS

| 2,961,833 | 11/1960 | Schwartz | 60/411 |
| 3,027,720 | 4/1962 | Tuck et al. | 60/337 X |

Primary Examiner—Edgar W. Geoghegan
Attorney, Agent, or Firm—John P. Moran

[57] ABSTRACT

The drawings illustrate a cooling system for use with a torque converter assembly and a radiator containing a coolant. The cooling system includes a plurality of circumferentially spaced cooling fan blades formed on the outer surface of the torque converter housing for rotation therewith, and opening means cooperating therewith. A shroud having speed responsive diverter means associated therewith is operatively connected at one end thereof to the opening means and mounted at the other end thereof adjacent a face of the radiator for cooling the coolant therein by communicating air toward or away from the radiator depending upon whether the fan blades are used as a blower or a suction device in particular vehicular applications.

6 Claims, 6 Drawing Figures

RADIATOR COOLING SYSTEM

The invention relates generally to cooling systems and, more specifically, to a finned torque converter housing and associated shroud for cooling a vehicle radiator or the like.

An object of the invention is to provide an improved cooling system which may either supplement or supplant the conventional engine driven fan.

Another object of the invention is to provide an improved cooling system wherein fan blades are formed on a torque converter housing, serving as a blower or suction device, and the air discharged thereby is channeled depending upon whether or not ram air is present, in conjunction with suitable shrouding extending from the casing surrounding the converter housing to the radiator as a means for cooling the coolant contained therein, at all engine speeds, and particularly when the engine is idling.

A further object of the invention is to provide a cooling system for use with a casing having a torque converter housing rotatably mounted therein and a radiator containing a coolant, and including a plurality of circumferentially spaced cooling fan blades formed on the outer surface of the torque converter housing for rotation therewith, opening means formed in a wall of the casing, and a shroud having speed responsive diverter means associated therewith and operatively connected at one end thereof to the opening means and mounted at the other end thereof adjacent a face of the radiator for accommodating the fan blades in either drawing ram air from the radiator through the torque converter to atmosphere during high engine speeds, or blowing ambient air from atmosphere through the torque converter to the radiator during idle or low engine speeds to thereby cool the radiator coolant during all driving conditions, depending upon whether the fan blades are used as a blower or a suction device in particular vehicular applications.

These and other objects and advantages will become more apparent when reference is made to the following description and accompanying drawings, wherein.

Figure 1:
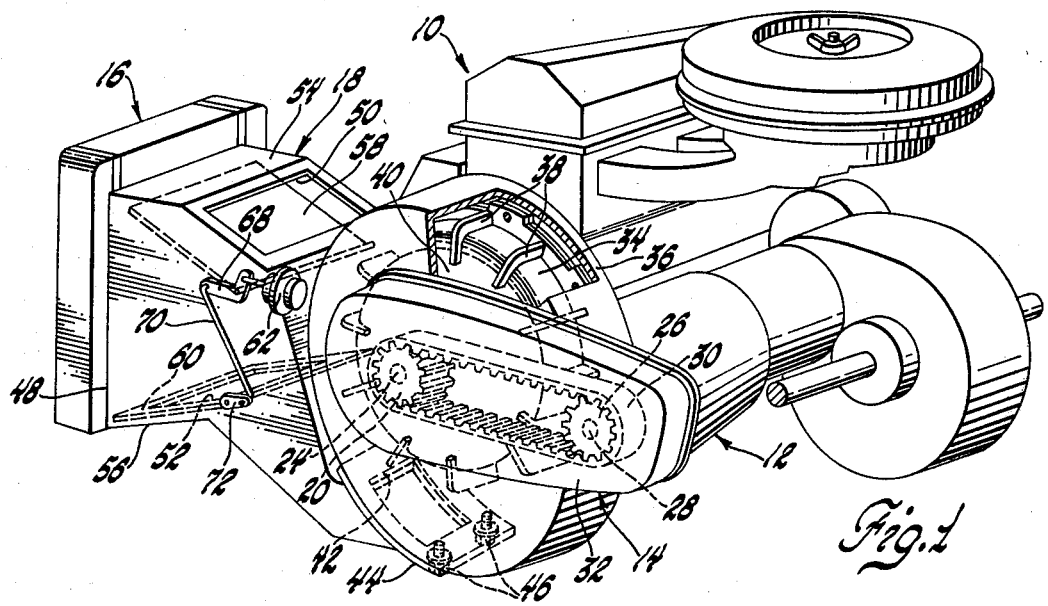
FIG. 1 is a perspective drawing of a vehicular engine, transmission and radiator embodying the inventive cooling system.

Referring now to the drawings in greater detail, FIG. 1 illustrates a transverse engine 10 and transmission 12 arrangement interconnected by a suitable drive transfer mechanism 14, and an accompanying radiator 16. A shroud 18 is shown communicating between the transmission and the radiator for aiding in cooling the latter in a manner to be described.

The drive transfer mechanism 14 includes a first sprocket 20 mounted on a stub shaft 24, a second sprocket 26 mounted on the transmission input shaft 28, and an interconnecting endless belt or chain 30 within a housing 32.

Figure 2:
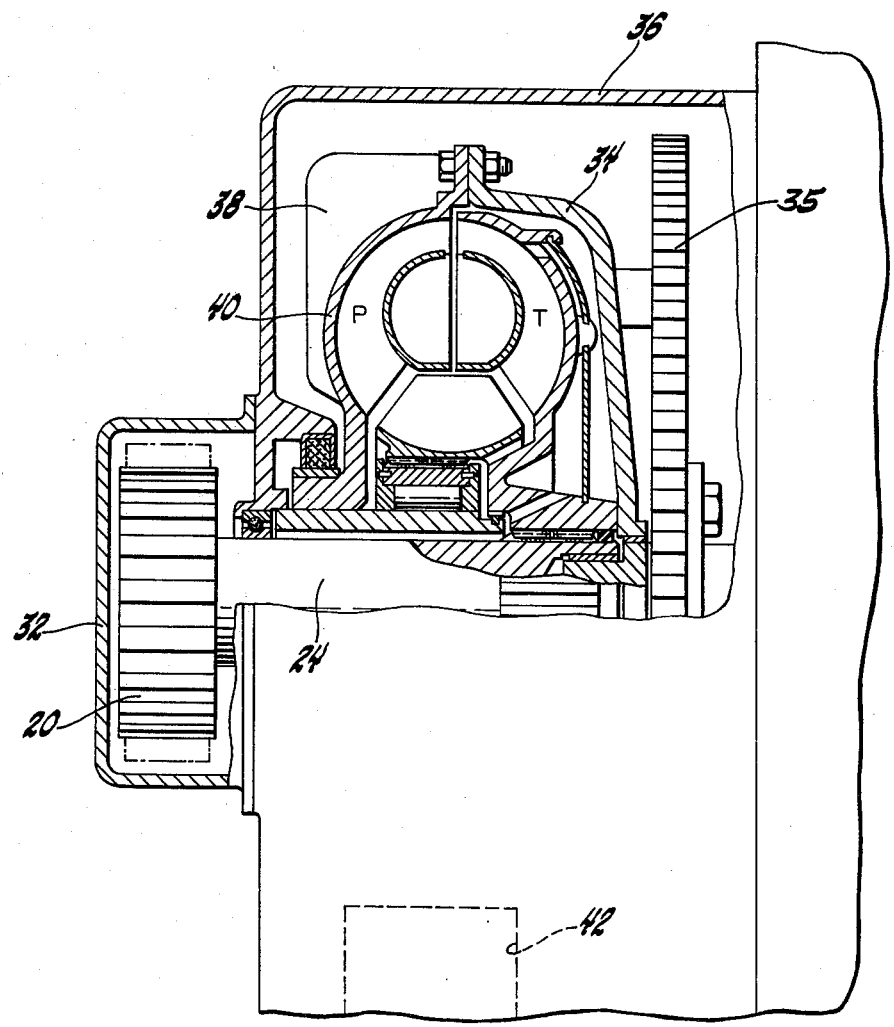
FIG. 2 is an enlarged cross-sectional view of an outer casing and inner torque converter housing embodied in the invention.

A torque converter housing 34 is rotatably driven by a flywheel 35 in the usual manner, within a suitable casing 36. In a manner somewhat similar to that taught by Tuck et al U.S. Pat. No. 3,027,720, a plurality of cooling fan blades 38 are secured to an outer surface of a portion 40 of the housing 34. An opening, represented at 42 in FIG. 2 is formed at a predetermined suitable location in a wall of the casing 36 for a purpose to be described.

The shroud 18 is mounted at one end 44 thereof around the opening 42 and secured to the casing 36 by any suitable means, such as bolts 46. The shroud 18 is formed to extend forwardly from the casing 36, terminating in an enlarged, substantially rectangular opening 48 positioned around the rear face of the radiator 16.

Figure 4:
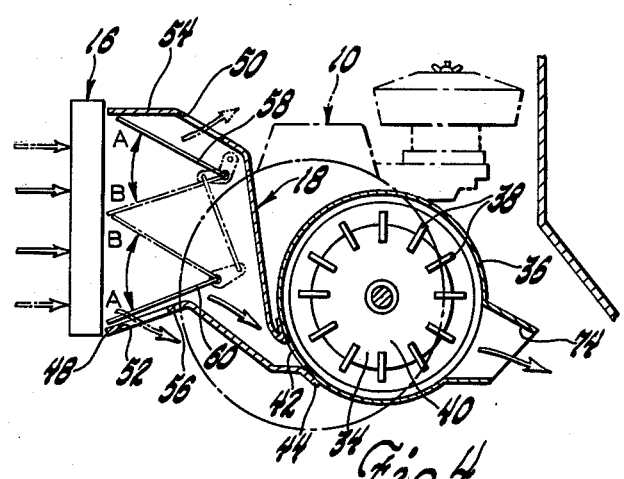
FIG. 4 is a cross-sectional schematic view of the FIGS. 1 and 2 arrangement.

As illustrated in FIG. 4, openings 50 and 52 are formed adjacent the top and bottom wall sections 54 and 56 of the rectangular end portion 48 of the shroud 18. Doors 58 and 60 are pivotally mounted just inside the openings 50 and 52, respectively. When in position A, the doors 58 and 60 block-off the openings 50 and 52 formed in the respective top and bottom wall sections 54 and 56. When in position B, the doors 58 and 60 serve as diverters to direct ram air entering through the radiator 16 to exhaust through the openings 50 and 52 of the shroud 18.

Figure 3:
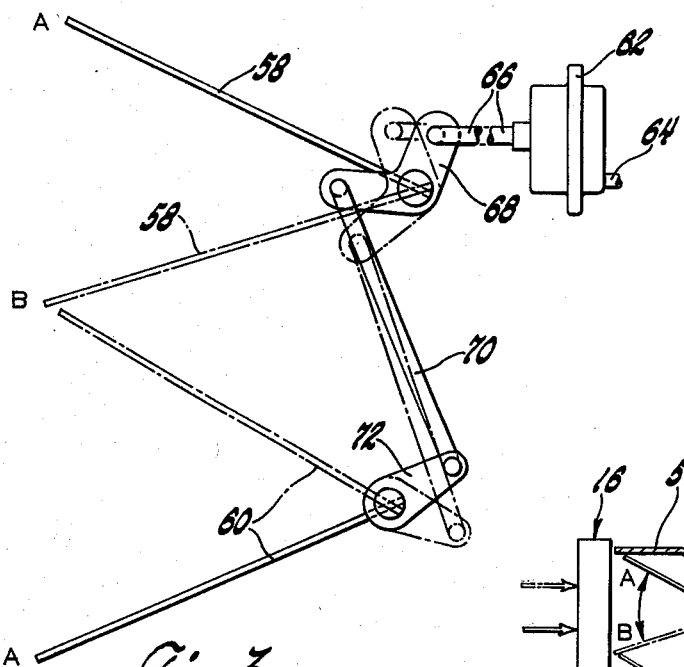
FIG. 3 is an enlarged side elevational view of a portion of the FIG. 1 structure.

The doors 58 and 60 may be actuated by any suitable means. A preferred actuating means is engine vacuum. A diaphragm mechanism 62 shown in FIG. 3 is responsive to engine vacuum via an inlet 64 operatively connected to the engine 10. Changes in vacuum moves a diaphragm (not shown) and a stem 66 secured to the diaphragm on the side thereof opposite the inlet 64, to thereby pivot an associated L-shaped link 68 to which the door 58 is secured. A rod 70 is secured at one end thereof to the link 68 and at the other end thereof to a second link 72, to which the door 60 is secured.

In operation, the pivotal linkage system just described is arranged such that, at high engine speeds and consequent low engine vacuum, the stem 66 is urged to the left in FIG. 3, thereby causing both doors 58 and 60 to pivot inwardly to the position B, diverting ram air, as indicated above, through the respective openings 50 and 52 (FIG. 4) of the shroud 18. At idle and low engine speeds, and consequent high engine vacuum, the stem 66 is moved to the right in FIG. 3, thereby causing both doors 58 and 60 to pivot outwardly to the position A of FIGS. 3 and 4. In this position, air is drawn through the radiator 16 by the fan blades 38 on the torque converter housing 34, through the opening 42 in the casing 36, and discharged through a discharge opening 74. Thus, means are provided for cooling the radiator coolant under all driving conditions.

Figure 5:
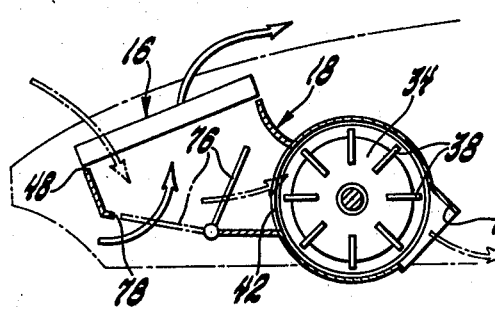
FIGS. 5 and 6 are cross-sectional schematic views of alternate embodiments of the inventive cooling system.

Referring now to FIG. 5, it may be noted that the radiator 16 is horizontally oriented, and only a single, bottom door 76 is associated with a bottom opening 78 formed in the shroud 18 adjacent the rectangular end portion 48 of the shroud 18. As such, at high engine speeds, ram air enters through the opening 78 and thence flows through the radiator 16 to exhaust from the upper face thereof. Under idle or low speed conditions, the fan blades 38 draw air through the radiator in the reverse direction, and discharge it through the opening 74.

Figure 6:
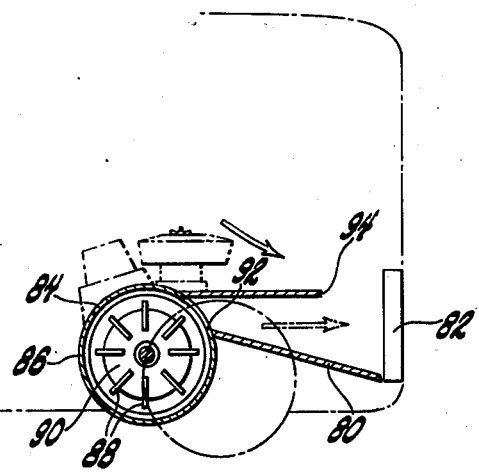

FIG. 6 illustrates a rear engine application, wherein ram air is channeled via a suitable diverging shroud 80 toward the rear-mounted radiator 82. Air is drawn in through a suitable opening 84 formed in the casing 86 by the blades 88 formed on the torque converter housing 90 and pumped thereby out through an opening 92 formed in the casing 86 into the shroud 80. The rear edge of the uper wall of the shroud 80 terminates short of the radiator 82 forming an opening 94, to allow ram air to impinge upon the front face of the radiator 82 and traverse through the radiator. When ram air is not present as would be the case during idle and low speed conditions, the air being pumped by the fan blades 88 of the torque converter housing 90 is sufficient to cool the radiator coolant.

It's apparent that the invention provides a simplified cooling system which may be used either as a primary or a supplemental means for cooling a conventional radiator, or other heat exchanger means, such as an auxiliary cooler used in trailering packages.

It should also be apparent that the invention need not be limited to a transverse engine and transmission application, but, with a suitably shaped shroud, may be used with a conventional "in-line" engine and transmission arrangement as well. Thus, while but three embodiments of the invention have been shown and described, other modifications thereof are possible.

The embodiments of the invention in which an exclusive property or privilege is claimed are defined as follows:

1. A cooling system for use with an engine and a transmission having a casing operatively connected therebetween, said casing having a torque converter housing rotatably mounted therein so as to be rotated by said engine, and a radiator including a coolant, said cooling system comprising a plurality of circumferentially spaced cooling fan blades formed on the outer surface of said torque converter housing for rotation therewith, first and second opening means formed in a wall of said casing, and a shroud secured at one end thereof to said casing around one of said first and second opening means and operatively mounted at the other end thereof adjacent a face of said radiator for communicating air between said radiator and said cooling fan blades.

2. A cooling system for use with an engine and a transmission having a casing operatively connected therebetween, said casing having a torque converter housing rotatably mounted therein so as to be rotated by said engine, and a radiator including a coolant, said cooling system comprising a plurality of circumferentially spaced cooling fan blades formed on the outer surface of said torque converter housing for rotation therewith, inlet and outlet openings formed in a wall of said casing, and a shroud secured at one end thereof to said casing around said inlet opening and operatively mounted at the other end thereof adjacent the rear face of said radiator for communicating air drawn through said radiator to said casing by said fan blades for exhaustion through said outlet opening during idle and low speed conditions.

3. A cooling system for use with an engine and a transmission having a casing operatively connected therebetween, said casing having a torque converter housing rotatably mounted therein so as to be rotated by said engine, and a vertically oriented radiator including a coolant, said cooling system comprising a plurality of circumferentially spaced cooling fan blades formed on the outer surface of said torque converter housing for rotation therewith, inlet and outlet openings formed in a wall of said casing, a shroud secured at one end thereof to said casing around said inlet opening and operatively mounted at the other end thereof adjacent the rear face of said radiator for communicating air drawn through said radiator to said casing by said cooling fan blades for exhaustion through said outlet opening during idle and low speed conditions, pivotable door means operatively connected to said shroud adjacent said radiator, and speed responsive means for actuating said pivotable door means to a position wherein said door means substantially block off communication of air from said radiator to said casing through said shroud during high speed conditions when ram air serves to cool the coolant in said radiator.

4. A cooling system for use with an engine and a transmission having a casing operatively connected therebetween, said casing having a torque converter housing rotatably mounted therein so as to be rotated by said engine, and a radiator mounted at a predetermined angle with respect to a horizontal plane and including a coolant, said cooling system comprising a plurality of circumferentially spaced cooling fan blades formed on the outer surface of said torque converter housing for rotation therewith, inlet and outlet openings formed in a wall of said casing, and a shroud secured at one end thereof to said casing around said inlet opening and operatively mounted at the other end thereof adjacent the lower face of said radiator for communicating air drawn through said radiator to said casing by said cooling fan blades for exhaustion through said outlet opening during idle and low speed conditions, a pivotable door operatively connected to said shroud adjacent said radiator, and speed responsive means for actuating said pivotable door to an open position wherein said door permits ram air to enter said shroud and directs the ram air toward the lower face of said radiator to thence flow upwardly through the radiator to cool the coolant therein during high speed conditions.

5. A cooling system for use with an engine and a transmission having a casing operatively connected therebetween, said casing having a torque converter housing rotatably mounted therein so as to be rotated by said engine, and a radiator including a coolant, said cooling system comprising a plurality of circumferentially spaced cooling fan blades formed on the outer surface of said torque converter housing for rotation therewith, inlet and oulet openings formed in a wall of said casing, and a shroud secured at one end thereof to said casing around said outlet opening and operatively mounted at the other end thereof adjacent a face of said radiator, said fan blades on said torque converter housing drawing air in through said inlet opening and pumping same to said radiator for cooling the coolant therein during idle and low speed conditions.

6. A cooling system for use with an engine and a transmission having a casing operatively connected therebetween, said casing having a torque converter housing rotatably mounted therein so as to be rotated by said engine, and a rear-mounted radiator including a coolant, said cooling system comprising a plurality of circumferentially spaced cooling fan blades formed on the outer surface of said torque converter housing for rotation therewith, inlet and outlet openings formed in a wall of said casing, a shroud secured at one end thereof to said casing around said outlet opening and operatively mounted at the other end thereof adjacent the front face of said rear-mounted radiator, and an opening formed in a portion of said shroud adjacent said front face of said rear-mounted radiator, said fan blades on said torque converter housing drawing air in through said inlet opening in said casing and pumping same to said radiator for cooling the coolant therein during idle and low speed conditions, and said opening in said shroud allowing ram air to impinge upon said radiator for cooling the coolant therein during high speed conditions.

* * * * *